(12) United States Patent
Slayzak et al.

(10) Patent No.: US 9,851,155 B2
(45) Date of Patent: Dec. 26, 2017

(54) REDUCTION OF SCALE BUILD-UP IN AN EVAPORATIVE COOLING APPARATUS

(71) Applicant: F.F. Seeley Nominees Pty Ltd., Lonsdale (AU)

(72) Inventors: Steven Slayzak, Denver, CO (US);
Robert Finley, Longmont, CO (US);
Leland Gillan, Denver, CO (US);
Benjamin Manley, Denver, CO (US);
David Thompson, Littleton, CO (US);
Daniel Zube, Denver, CO (US)

(73) Assignee: F.F. Seeley Nominees Pty Ltd., Lonsdale (AU)

( * ) Notice: Subject to any disclaimer, the term of this patent is extended or adjusted under 35 U.S.C. 154(b) by 618 days.

(21) Appl. No.: 14/309,166

(22) Filed: Jun. 19, 2014

(65) Prior Publication Data

US 2014/0374067 A1 Dec. 25, 2014

Related U.S. Application Data

(60) Provisional application No. 61/837,161, filed on Jun. 19, 2013.

(51) Int. Cl.
*F28C 1/00* (2006.01)
*F28D 15/02* (2006.01)
(Continued)

(52) U.S. Cl.
CPC ............. *F28D 15/02* (2013.01); *F28D 5/00* (2013.01); *F28D 9/0062* (2013.01); *F28F 3/02* (2013.01);
(Continued)

(58) Field of Classification Search
CPC ........ F28F 13/182; F28F 13/187; F28F 19/02; F28F 19/04; F25B 2500/04; F25B 2339/041; F25B 2339/043; F25B 2500/11
(Continued)

(56) References Cited

U.S. PATENT DOCUMENTS 3,613,779 A 10/1971 Brown
5,187,946 A 2/1993 Rotenberg et al.
(Continued)

FOREIGN PATENT DOCUMENTS

WO 03049844 A1 6/2003

OTHER PUBLICATIONS

PCT International Search Report for PCT International Patent Application No. PCT/US2014/043164, dated Oct. 21, 2014.
(Continued)

*Primary Examiner* — Orlando E Aviles Bosques
(74) *Attorney, Agent, or Firm* — Northstar Law Group; Thomas J. Bassolino

(57) ABSTRACT

In one embodiment, a plate for an evaporative cooler is disclosed. The plate may comprise a wicking material with an exposed surface and a sealed surface opposite the exposed surface. An impermeable barrier may be coupled to the sealed surface. One or more masks may line a portion of the exposed surface, wherein the masks may comprise an impermeable material. In some embodiments, the mask may be a strip of impermeable material and may be coupled to a flat area of the top surface. In further embodiments, the one or more masks may align with a liquid wick path of the wicking material. In further embodiments, the one or more masks may line the edge of perforations that pass at least partially through the plate.

17 Claims, 11 Drawing Sheets

(51) Int. Cl.
  *F28D 9/00*   (2006.01)
  *F28F 3/02*   (2006.01)
  *F28F 19/00*  (2006.01)
  *F28D 5/00*   (2006.01)
  *F28F 11/04*  (2006.01)
  *F28F 13/18*  (2006.01)

(52) U.S. Cl.
  CPC .............. *F28F 11/04* (2013.01); *F28F 19/00* (2013.01); *F25B 2339/041* (2013.01); *F25B 2339/043* (2013.01); *F25B 2500/04* (2013.01); *F25B 2500/11* (2013.01); *F28F 13/182* (2013.01); *F28F 13/187* (2013.01)

(58) Field of Classification Search
  USPC ..... 165/133, 104.26, 911, 907; 261/DIG. 16, 261/154, 104
  See application file for complete search history.

(56) References Cited

U.S. PATENT DOCUMENTS

| | | | |
|---|---|---|---|
| 6,581,402 B2 | 6/2003 | Maisotsenko et al. | |
| 6,650,544 B1* | 11/2003 | Lai | F28D 15/046 165/104.21 |
| 2010/0018234 A1* | 1/2010 | Gillan | F28D 5/02 62/259.4 |

OTHER PUBLICATIONS

Written Opinion of the International Searching Authority dated Oct. 21, 2014 in PCT/US2014/043164, Applicant Coolerado Corporation (8 pages).

\* cited by examiner

SECT. A-A

SECT. B - B

SECT. B - B

SECT. A-A

SECT. A-A

REDUCTION OF SCALE BUILD-UP IN AN EVAPORATIVE COOLING APPARATUS

RELATED APPLICATIONS

This application claims priority to provisional patent application No. 61/837,161 titled "Scale Reduction Due to Perturbations in Wicks or Air Flow Geometry", filed Jun. 19, 2013. This application is herein incorporated by reference for all that it discloses.

TECHNICAL FIELD

The technology of the present application relates generally to evaporative air conditioners and, more specifically, to a wicking surface designed for use in evaporative air conditioners.

BACKGROUND

Evaporative cooling is a method of cooling a gas stream, usually air, by evaporating a liquid, usually water. The temperature of the air is reduced by introducing water vapor into it through evaporation. Water typically contains dissolved minerals, so when the water evaporates, minerals may be discharged in the form of a film or residue on the surface from which the water evaporated. The residue can accumulate over time resulting in scale-build up on the surface. As scale build-up increases, the effectiveness and efficiency of the evaporative cooling system decreases. Usually, the evaporative cooling system's ineffective hardware is replaced or cleaned. However, as evaporative cooling systems have become more expensive and/or more complex, these solutions are costly.

SUMMARY

In one embodiment, a plate for an evaporative cooler is disclosed. The plate may comprise a wicking material with at least one exposed surface and one or more masks lining a portion of the at least one exposed surface. In some embodiments, the masks may comprise an impermeable material.

In further embodiments, the wicking material may comprise an exposed surface and a sealed surface opposite the exposed surface. The sealed surface may comprise an impermeable barrier. One or more masks may comprise a strip of an impermeable material coupled to a flat area of the exposed surface. In further embodiments, at least two masks may line a portion of the exposes surface, wherein the at least two masks may align with each other. In further embodiments, the one or more masks may align with a liquid wick path of the wicking material. The one or more masks may comprise a surface area sufficient to cause a wick rate through the wicking material to exceed an evaporation rate potential of the exposed surface. One or more channel guides may be coupled to the exposed surface of the wicking material. One or more perforations may pass at least partially through the plate, wherein the one or more masks may line the perforations. The one or more masks may be positioned to relocate a dry-to-wet transition zone from an edge of at least one perforation to a junction between the exposed surface and the at least one mask.

In further embodiments, one or more masks may comprise a strip of impermeable material coupled to a flat area of the at least one exposed surface. At least two masks may line a portion of the at least one exposed surface, wherein the masks may align with each other. In some embodiments, the one or more masks may align with a liquid wick path of the wicking material. The one or masks may also comprise a surface area sufficient to cause a wick rate through the wicking material to exceed an evaporation rate potential of the at least one exposed surface.

In another exemplary embodiment, an evaporative cooler may be disclosed. The evaporative cooler may comprise an assembly of one or more plates. A liquid delivery system may be proximate the one or more plates. At least one plate may comprise a wicking material with at least one exposed surface. One or more masks may line a portion of the at least one exposed surface, wherein the one or more masks may comprise a strip of impermeable material. The one or more masks may comprise a surface area sufficient to cause a wick rate through the wicking material to exceed an evaporation rate potential of the at least one exposed surface.

In another exemplary embodiment, an evaporate air cooler may comprise an assembly of at least two or more plates, wherein the at least two plates are separated by one or more channel guides. The at least two plates may comprise a wicking material with an exposed surface and a sealed, impermeable surface opposite the exposed surface. One or more masks may line a portion of the exposed surface, wherein the one or more masks may comprise an impermeable material. In some embodiments, one or more troughs may be proximate the at least two plates and a liquid delivery apparatus may be proximate the one or more troughs. In additional embodiments, one or more perforations may be present in at least one, wherein the one or more masks may line the perforations. The one or more masks lining the perforation may consist of a washer or a grommet.

For the purposes of this application, the term "aligned" refers to orientations that are parallel, substantially parallel, or forming an angle less than 35 degrees. Further, for the purposes of this application, the term "transverse" refers to orientations that are perpendicular, substantially perpendicular, or forming an angle between 125 degrees and 55 degrees.

BRIEF DESCRIPTION OF THE DRAWINGS

The accompanying drawings illustrate various embodiments of the present method and system and are a part of the specification. The illustrated embodiments are merely examples of the present system and method and do not limit the scope thereof.

Throughout the drawings, identical reference numbers designate similar, but not necessarily identical, elements. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Evaporative air cooling systems often have a complex heat and mass exchanger system. Evaporative cooling systems may comprise direct evaporative cooling systems, indirect evaporative cooling systems, two-stage evaporative cooling systems, hybrid systems, and the like. Evaporative air cooling systems work by introducing air into the system, then cooling the air with a liquid vapor, typically water vapor. As the water evaporates, it may leave behind a residue on a plate in an evaporative cooler due to various minerals contained in the liquid. The accumulation of residue on the plates may cause scale build-up. The presence of scale build-up on the plates may decrease the efficiency and/or effectiveness of the evaporative cooling system.

According to one configuration, a plate for an evaporative cooler system may be lined with one or more masks. For example, the plate may comprise a wicking material with an exposed surface and a sealed surface. One or more masks may line a portion of the exposed surface of the plate. The masks may comprise an impermeable material which may prevent the liquid from evaporating through them. The one or more masks may line a flat surface of the exposed surface and/or the one or more masks may line one or more perforations present in the plate.

Figure 1:
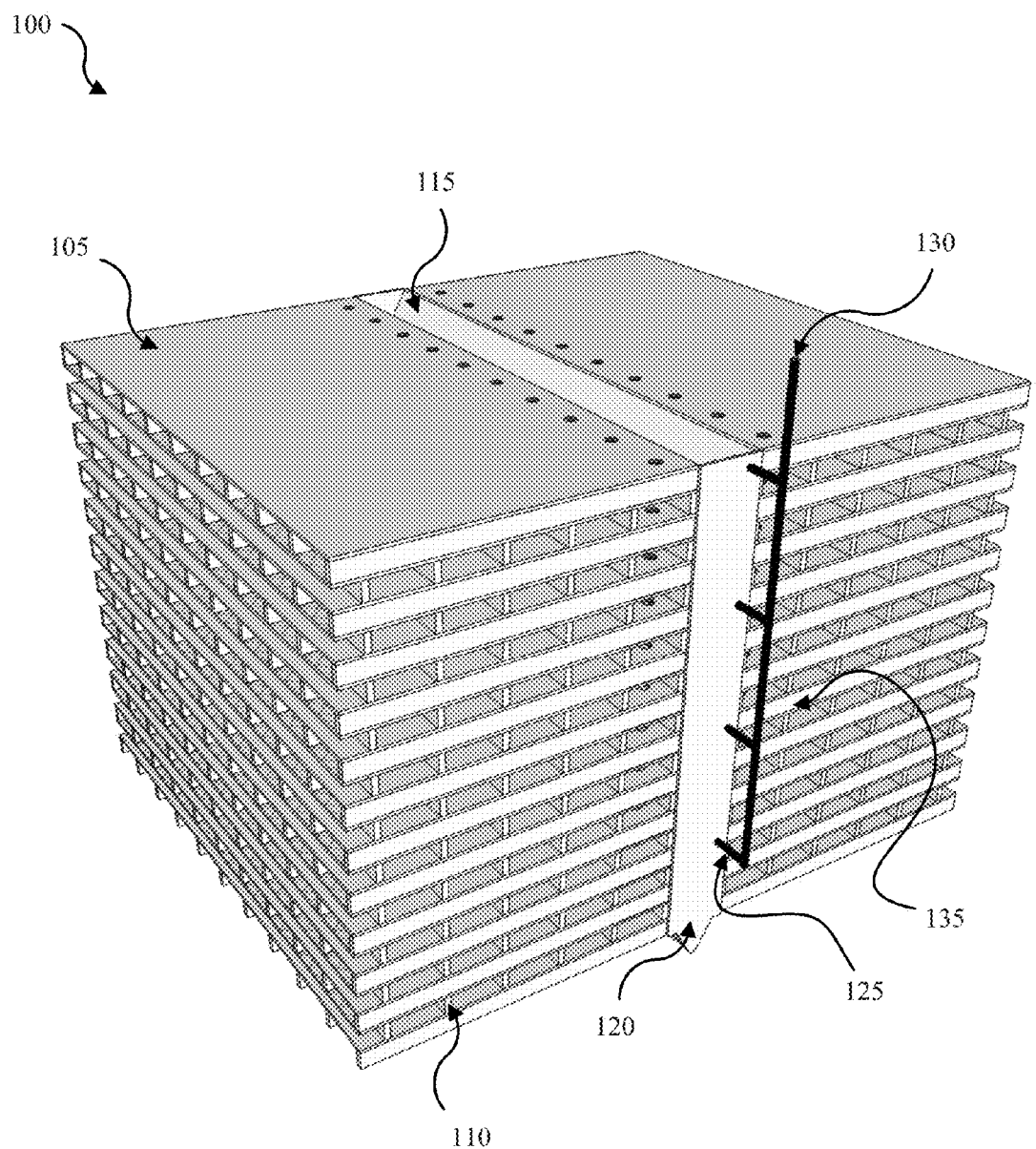
FIG. 1 is an isometric view of an exemplary evaporative cooling system according to one exemplary embodiment.

FIG. 1 illustrates an exemplary evaporative cooling system 100. The system 100 may comprise a heat and mass exchange system. In some embodiments, the system 100 may include one or more plates 105, a trough 115, and a liquid delivery system 135. In alternative embodiments, the system 100 may include additional or fewer components. For example, in some embodiments, the system 100 may include a fan (not shown) which introduces air into the system 100. The system 100 may also include an air discharge system (not shown), a water discharge system (not shown) or the like.

In some embodiments, the plates 105 may be stacked to form a substantially three-dimensional shape. The shape may be cubic, rectangular, or the like. In some embodiments, the plates 105 may comprise a substantially planar surface. One or more channel guides 110 may separate the plates 105 to allow air flow between the plates 105. In one embodiment, the plate 105 may comprise a porous material. The porous material may have wicking capabilities and/or may allow a gaseous medium to flow through it. In further embodiments, the porous material may be a sheet of polymer material, such as polypropylene spun bond material forming a fiber surface. In further embodiments, the wicking material may comprise a polymer-based, cellulose, or other organic material. One side of the plate 105 may comprise a non-permeable material. For example, one side of the plate 105 may comprise another type of polymer material, such as a polypropylene/polyethylene extruded seal layer; however, any appropriate type of polymer material may be used. The seal layer may be adhered, cast on, melted to, heat staked, or otherwise affixed to the plate 105. In some embodiments, the plate 105 may be approximately 20 inches wide by approximately 19.5 inches long and approximately 0.01 inches thick. However, any appropriate dimensions in accordance with the principles described herein may be used.

In some embodiments, a trough 115 may be proximate the plates 105. The trough 115 may be an open-top vessel capable of retaining a liquid which may be vaporized for cooling. In some embodiments, the trough 115 may be a feature of the plate 105. For example, the troughs 115 may be formed approximately in a center of the plate 105. The troughs 115 may align when the one or more plates 105 are stacked together. The system 100 may include a trough seal 120 on either side of the trough 115. The trough seal 120 may retain liquid inside the troughs 115. For example, in some embodiments, the system 100 may include a liquid delivery system 135. The liquid delivery system 135 may comprise fill tubes 125 which may distribute a liquid to various troughs 115. A fill tube header 130 may be connectively coupled to the fill tubes 125 such as to supply the liquid to the fill tubes 125.

Figure 2:
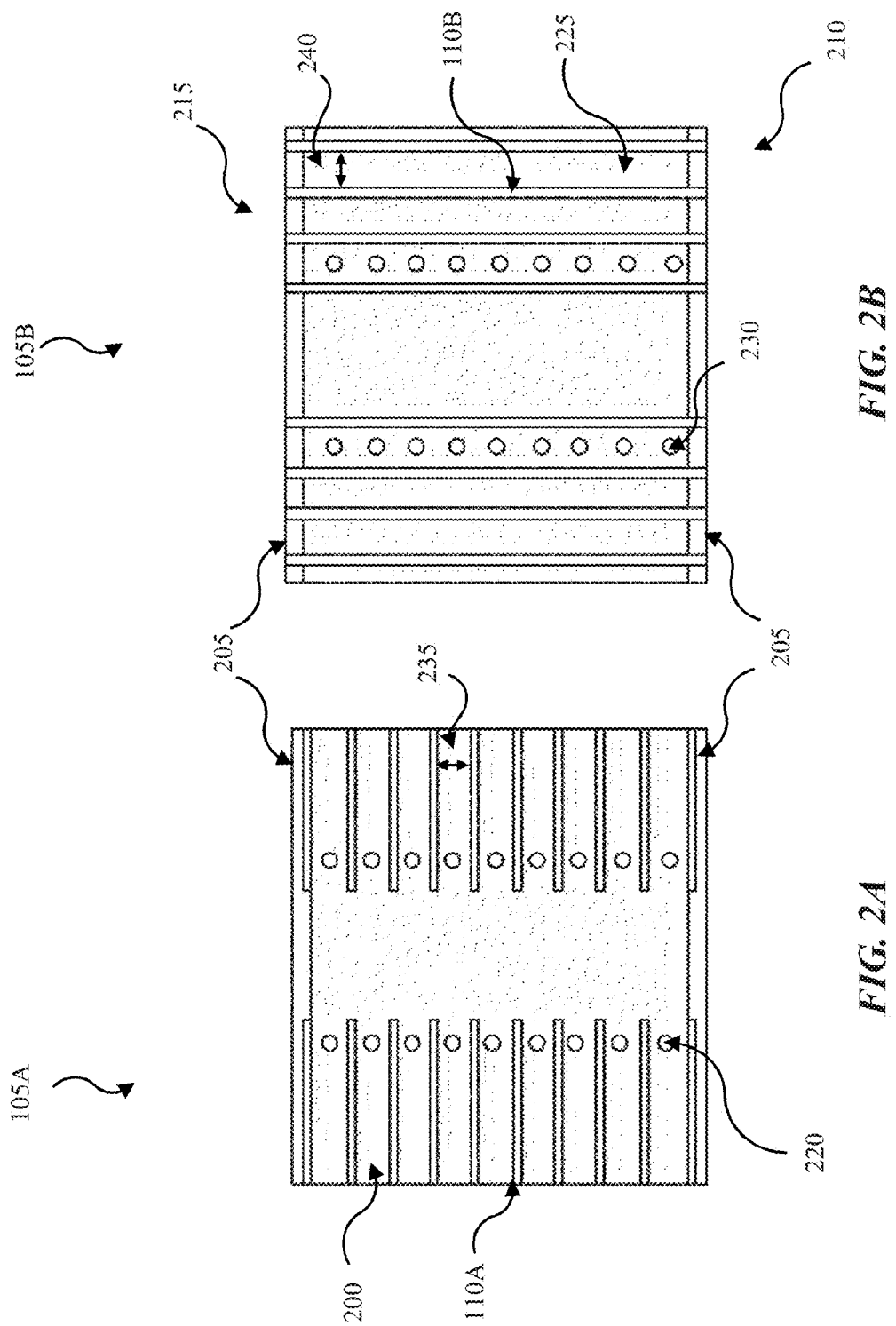
FIGS. 2A & 2B are top views of exemplary plates used in the evaporative cooling system of FIG. 1.

FIG. 2A is a top view of a wet plate 105A. For the purposes of this disclosure, the term "wet plate" indicates plates 105A constructed to contain moisture on a top side of the plate 105A. In some embodiments, the wet plate 105A may include two or more wet side channel guides 110A. For example, in some embodiments, the wet plate 105A may contain two wet channel guides 110A on opposing sides of the wet plate 105A. In further embodiments, the wet plate 105A may contain multiple channel guides 110A forming multiple wet channels 200. In some embodiments, one or more seals 205 may be formed at opposing ends 210, 215 of the wet plate 105A. In some embodiments, a distance 235 between the wet channel guides 110A may be approximately one inch. In additional embodiments, the wet channel guide 110A spacing may be increased or decreased for desired air flow.

In further embodiments, one or more perforations 220 may be formed in the body of the wet plate 105A. The perforations 220 may allow air or liquid to flow through them. The perforations 220 may be separated by wet channel guides 110A. In some embodiments, multiple perforations 220 may be formed within the body of the wet plate 105A and may align in a substantially linear pattern. The substantially linear pattern may be substantially perpendicular to the wet channel guides 110A. In further embodiments, as shown in FIG. 2A, the one or more perforations 220 may form two substantially linear patterns which may be substantially parallel to each and substantially perpendicular to the channel guides 110A.

FIG. 2B is a top view of a dry plate 105B. For the purposes of this disclosure, the term "dry plate" indicates plates 105 having channels guides 110 on the dry side of the plate 105. The dry plate 105B may contain one or more channel guides 110B. The channel guides 110B may be substantially perpendicular to the seals 205, and may be formed on top of the seals 205. In some embodiments, multiple dry channel guides 110B may be present. The dry channel guides 110B may form one or more dry channels 225. The dry channels 225 may be substantially perpendicular to the seals 205. In further embodiments, a width 240 of the dry channels 225 may be approximately one inch. However, any appropriate thickness may be used. The dry channels 225 may run substantially across a top surface 305 (see FIG. 3) of the dry plate 105B.

In some embodiments, the dry plate 105B may contain one or more perforations 230. The perforations 230 may allow for air or liquid to flow through them. The perforations 230 may not be necessary in dry plates 105B if the perforations 220 are provided in the wet plates 105A or vice versa. However, in some embodiments, perforations 220, 230 may be provided in both the wet and dry plates 105A, 105B. In some embodiments, multiple perforations 230 may be formed within the body of the dry plate 105B and may align in a substantially linear pattern. The substantially linear pattern may be substantially parallel to the dry channel guides 110B. The substantially linear pattern of the perforations 230 may be contained between two dry channel guides 110B. In further embodiments, as shown in FIG. 2B, the one or more perforations 220 may be formed in two substantially linear patterns which may be substantially parallel to each other and substantially parallel to the channel guides 110B.

Figure 3:
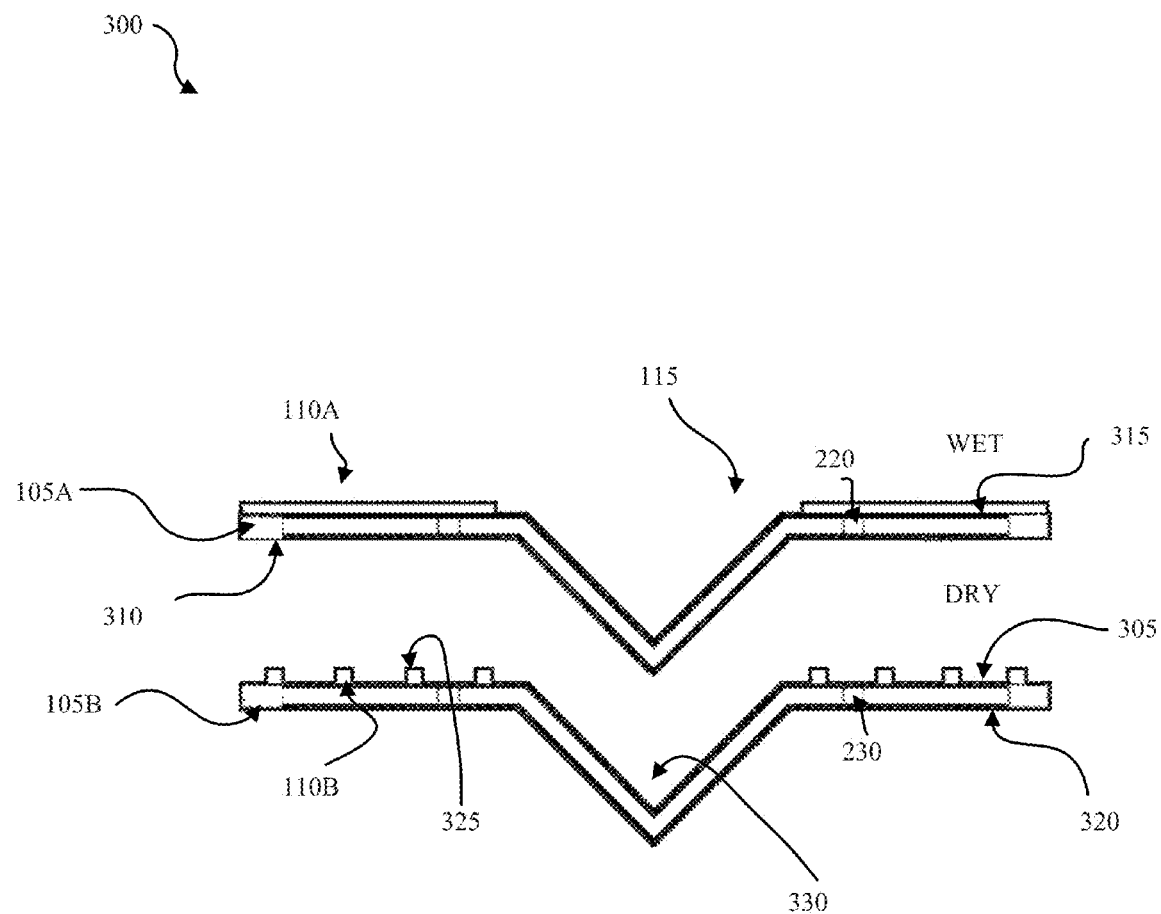
FIG. 3 is an exploded side view of the plate assembly used in the evaporative cooling system of FIG. 1, according to one exemplary embodiment.

FIG. 3 is an exploded side view of an assembly 300 comprising the wet plate 105A and the dry plate 105B. The assembly 300 may comprise the plates 105 in a substantially stacked configuration. The stacked configuration may represent a potential use of the plates 105 in an evaporative cooling system (e.g. system 100). As shown in FIG. 3, the top plate is the wet plate 105A and the bottom plate is the dry plate 105B. The bottom surface 320 of the dry plate 105B and a top surface 315 of the wet plate 105A may be exposed to a liquid. The surfaces 320, 315 may comprise a wicking material. The wicking material may comprise a polymer spun bound material, cellulose, or other organic material. In further embodiments, a bottom surface 310 of the wet plate 105A and a top surface 305 of the dry plate 105B may be sealed. For example, the surfaces 310, 305 may comprise a non-permeable material. The non-permeable material may be a polymer extruded seal layer and may be affixed or otherwise coupled to the spun bond material.

When assembled, the bottom surface 310 of the wet plate 105A may rest upon a top surface 325 of the dry channel guides 110B. The dry channel guides 110B may be sized such that a distance between the bottom surface 310 of the wet plate 105A and the top surface 305 of the dry plate 105B is substantially uniform. For example, the dry channel guides 110B may be approximately 0.14 inches high such that the distance between the plates 105A, 105B is approximately 0.14 inches. Subsequently, when a second dry plate 105B is assembled on top of the wet plate 105A, the wet channel guides 110A may define a distance between the two plates 105A, 105B. The distance may be approximately 0.09 inches. The distances between the plates 105 may be adjusted to maximize efficiency or to achieve a desired air flow.

In additional embodiments, each plate 105A, 105B may include a trough 115. As mentioned previously, the trough 115 may be an open-topped vessel which may retain a liquid used in cooling. The troughs 115 may align such that the troughs 115 may fit inside one another or nest together when the plates 105A, 105B are assembled. The trough 115 may have a substantially triangular shape. The triangular shape may allow a fluid used in cooling, such as water, to collect in a bottom 330 of the trough 115. In alternative embodiments, the troughs 115 may comprise a substantially circular shape, oval shape, non-uniform shape, or the like. In further embodiments, the troughs 115 may provide an evaporative liquid, such as water, to the wet sides of the plates 105.

Figure 4:
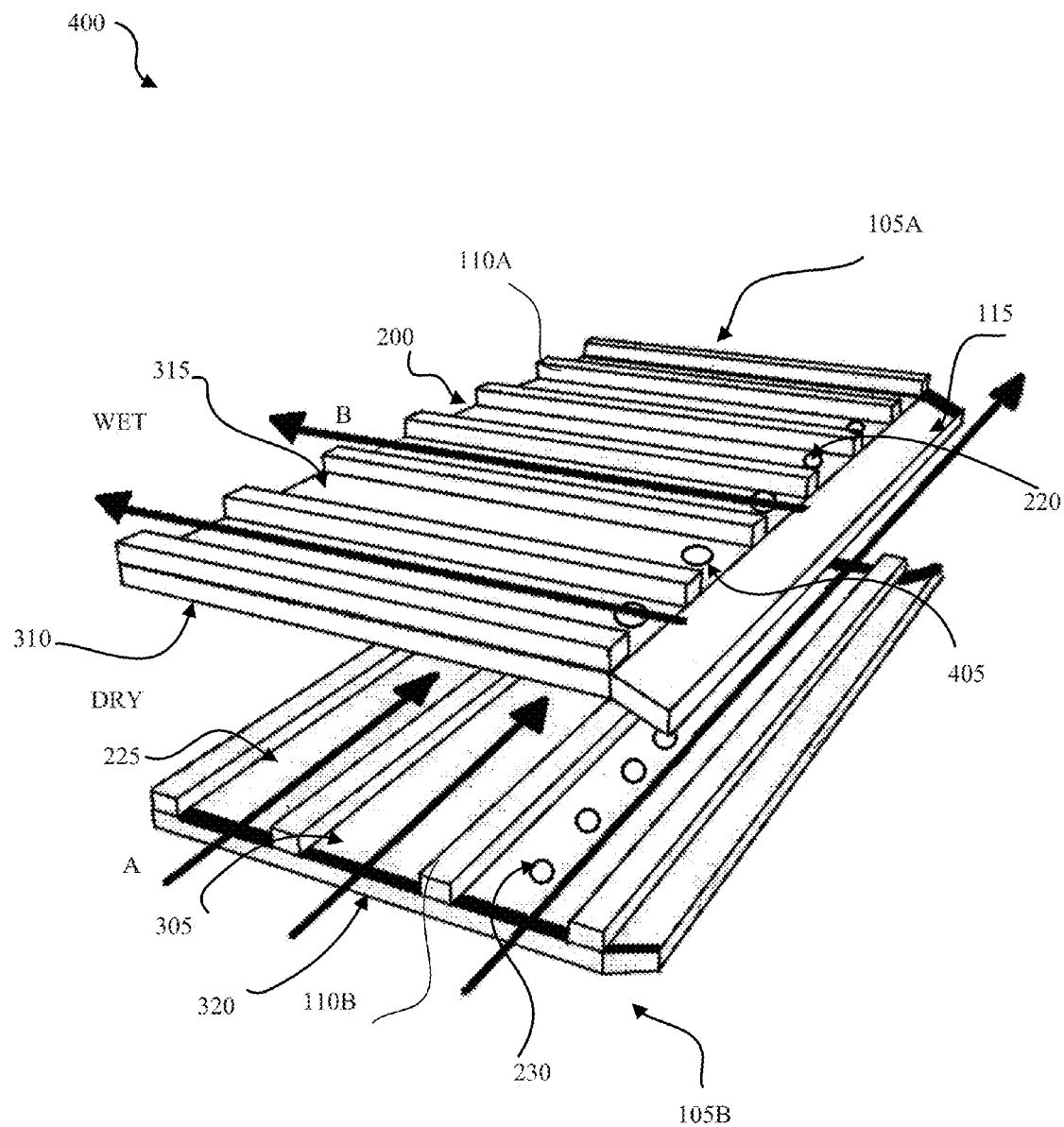
FIG. 4 is an exploded isometric view of the plate assembly shown in FIG. 3, according to one exemplary embodiment.

FIG. 4 is a working schematic representation of an evaporative cooling system 400 according to this disclosure. The system 400, as displayed, is an isometric view of FIG. 3. The system 400 may cool air, called product air, through the use of humid air, called working air. Air may be introduced in the system 400 via a number of methods. For example, air may be drawn into the system 400 via a fan, wind, bellows, Coanda effect, suction, and the like. In further embodiments, the system 400 may have multiple plates 105A, 105B with a dry side and a wet side.

The system 400 may cool air by passing product air through the dry channels 225 as shown by arrows A. Working air may be fractioned off into the wet channels 200. The working air may travel the length of the wet channels 200 as shown by arrows B. As mentioned previously, the wet side of the plates 105 may comprise a wicking material. The wicking material may draw liquid stored in the troughs 115 through the wet channels 200. As the working air passes through the wet channels 200 along path B, the liquid may evaporate and cool the working air. As the product air travels along path A in the dry channel 225, the product air may be cooled via heat transfer. For example, heat in the product air may be transferred to the working air. Therefore, the system 400 may produce a cool, dry product air and may discharge a humid, hot working air.

As the liquid is drawn from the trough 115, the liquid may travel through the wet channels 200 along a liquid wick path, which may be substantially parallel to arrows B. As the liquid evaporates, the liquid may leave behind minerals and other discharge materials once contained within the liquid resulting in scale build-up. Scale build-up may occur on a wicking surface in regions where the evaporation rate potential exceeds the wick rate. Evaporation rate potential is the maximum potential volume of liquid that is capable of evaporating off of a surface, and is influenced by changes in flow velocity, temperature, flow geometry, or any combination thereof. Wick rate is the rate at which any volume of liquid flows through a medium. The evaporation rate potential may exceed the wick rate in areas where a perturbation exists in the wicking material on surfaces 315 and/or 320, and/or in the flow characteristics of the gas. A perturbation in the wicking material on surfaces 315 and/or 320 may be a discontinuity, obstruction, or another anomaly restricting the flow of liquid and reducing wick rate. A perturbation in the flow characteristics of the air flow may be exhibited by an increased temperature, velocity (e.g. increasing or decreasing the width 235 of the wet channels 200), and/or surface area (e.g. increasing or decreasing the width 235 of the wet channels 200) which may lead to an increased evaporation rate potential.

Additionally, a perforation (e.g. perforation 220 and/or 230) through both the wick material and opposite dry side may also be susceptible to scale build-up because the perforation 220 and/or 230 may create a discontinuity relative to liquid flow where the wet and dry side meet. The discontinuity may lead to a reduced wick rate at that juncture. Compounding this effect, the exposed thickness of the wick material due to the perforation 220 and/or 230 may increase the available surface area for evaporation. This may increase evaporation rate potential to a point where the evaporation rate potential exceeds the local wick rate at the perforation edge 405. This type of scale build-up is referred to as mineral doming, since over time the deposited minerals form a dome over the perforation 220 and/or 230, covering the perforation 220 and/or 230 and preventing gaseous flow from passing through the perforation 220 and/or 230.

Scale build-up may form on other areas of the wicking material if an intrinsic liquid flow restriction (i.e. reduced wick rate) exists in the wicking material itself. The reduced wick rate may increase the likelihood of scale build-up if an increased evaporation rate potential exists due to perturbations in the gaseous flow such as elevated temperature and/or velocity, or flow geometry. Scale build-up on the top surface 315 of the plate 105A and/or the bottom surface 320 of the plate 105B may be a result of superficial deposition.

Figure 5:
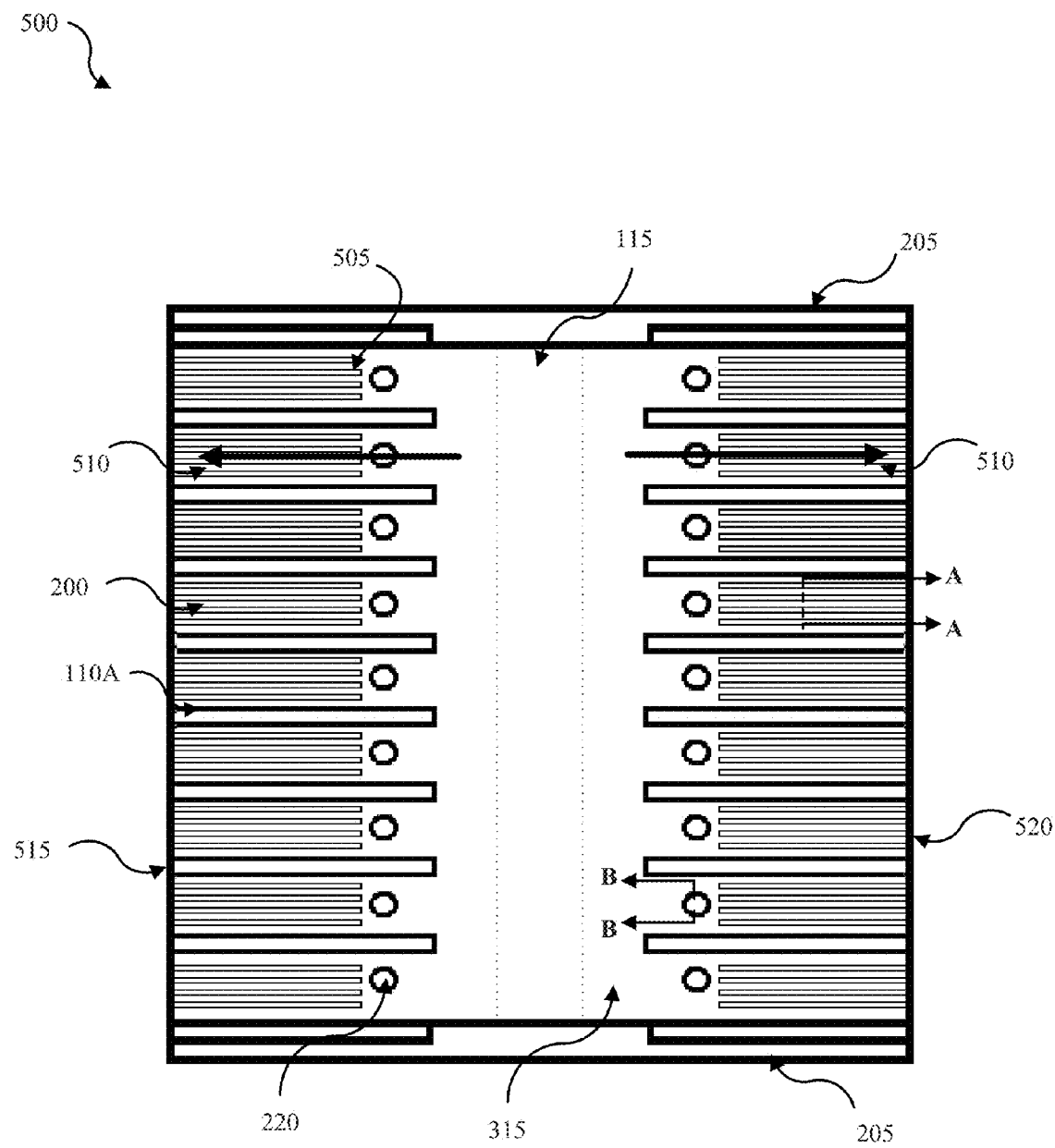
FIG. 5 is a top view of an exemplary wet plate used in the evaporative cooling system of FIG. 1 according to one exemplary embodiment.

FIG. 5 is a top view of an exemplary wet plate 500 which may reduce and/or prevent scale build-up. The wet plate 500 is similar to the wet plate 105A (FIGS. 2-4) and may incorporate similar features. For example, the wet plate 500 may comprise a porous, wicking material. The wicking material may have an exposed surface which may correlate to the top surface 315, and a sealed surface, which may correlate to the bottom surface 310 (See FIG. 6). In some embodiments, the wet plate 500 may include wet channel guides 110A, one or more wet channels 200, perforations 220, and end seals 205. The wet plate 500 may additionally incorporate one or more masks 505. As will be described in greater detail below, the masks 505 may reduce the evaporation rate which may prevent and/or reduce scale build-up.

The masks 505 may comprise a dry impermeable material. The impermeable material may be a polymer extruded seal layer. The masks 505 may be adhered, heat bonded, taped, sprayed, or otherwise coupled to the wet plate 500. In further embodiments, the masks 505 may be attached to the wet plate 500 via vapor deposition, painted, spray-coated, electro-plated, chemical vapor deposition, physical vapor deposition, electrolysis, plated, or the like. In some embodiments, the mask 505 material and the bottom surface 310 material may be substantially similar. As shown in FIG. 5, the masks 505 may be substantially rectangular, or may be strips of the impermeable material. Multiple masks 505 may be present and may be substantially aligned to each other. For example, the masks may be aligned, parallel, or substantially parallel to each other. In some embodiments, multiple masks 505 may be bordered by one or more wet channel guides 110A. In some embodiments, the masks 505 may be parallel a liquid wick path 510. For example, liquid may be present in a trough 115. The top surface 315 of the wet plate 500 may comprise a wicking material which may pull the liquid from the trough 115 into the wet plate 500. The liquid may follow a liquid wick path 510. The masks 505 may be substantially parallel to the liquid wick path 510 which may optimize their effectiveness.

As depicted in FIG. 5, the masks 505 may extend from sides 515, 520 of the wet plate 500 towards the trough 115. In some embodiments, the masks 505 may end prior to reaching the perforations 220. In further embodiments, the masks 505 may extend beyond the perforations 220. In still further embodiments, the masks 505 may extend from the sides 515, 520 of the wet plate 500 until the masks 505 reach the trough 115.

In further embodiments, fewer or more masks 505 may be present. The quantity and size of each mask 505 may depend upon the relationship between the evaporation rate potential and the wick rate. Fewer masks 505 with a reduced surface area may be used if a small evaporation rate/wick rate imbalance exists within the wick material. Conversely, a large number of masks 505 with an increased surface area may be utilized if a large imbalance exists. The number and sizes of masks 505 may vary between applications. However, the number and size of the masks 505 should optimize the ratio of evaporative surface area to mask 505 surface area. The masks 505 may cover the top surface 315 of the plate 105A and/or bottom surface 320 of the plate 105B sufficiently to increase the wick rate of the plate 105A and/or 105B over the evaporation rate, with enough liquid for overflow. For example, the masks 505 may optimize a ratio of evaporation rate to wick rate such that enough liquid is available to evaporate plus overflow. In some embodiments, the overflow liquid may flush out highly-concentrated amounts of dissolved minerals which may accumulate during the evaporation process.

Figure 6:
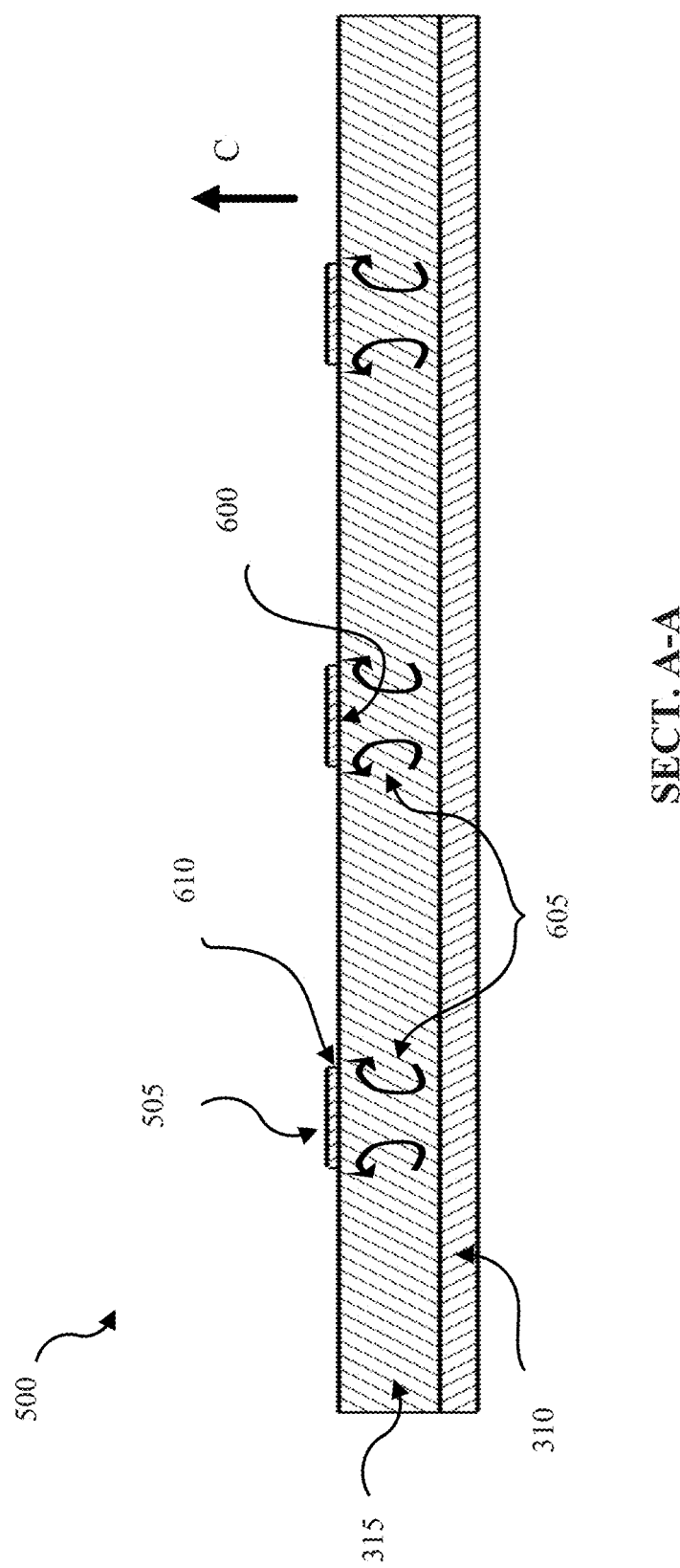
FIG. 6 is a cross-sectional view A-A of a portion of the exemplary wet plate of FIG. 5, according to one exemplary embodiment.

FIG. 6 is an exemplary cross-section A-A of the wet plate 500 shown in FIG. 5. The wet plate 500 may comprise a top surface 315, and a bottom surface 310 opposite the top surface 315. The top surface 315 may comprise a wicking material and the bottom surface 310 may comprise an impermeable layer. In some embodiments, the wet plate 500 may comprise one or more masks 505. In alternative embodiments, the wet plate 500 may include additional or fewer features than that which is shown in FIG. 6.

The masks 505 may be substantially evenly spaced on the top surface 315 of the wet plate 500. The uniformity of the masks 505 may decrease perturbations in the liquid flow and reduce scale-build up. Additionally, the masks 505 may have a substantially low profile, such that the masks 505 do not cause or contribute any additional perturbations to the gaseous flow. In some examples, a thickness of the mask may be less than 0.01 inches, but it may also be as large or as small as necessary to match the relative sizing requirements of the application. Furthermore, a width of the mask 505 may be sized to ensure that wick rates always exceed evaporation rates. In some embodiments, the top surface 315 may be saturated. For example, liquid may be flowing through the plate 105A and the plate 105A may be wet. The mask 505 may prevent a portion of the liquid from evaporating. For example, the liquid flowing through the wet plate 500 may evaporate upwards, as indicated by arrow C. Working air may pass over the top surface 315 of the wet plate 500 and become saturated with the evaporated liquid. In some embodiments, the presence of the mask 505 may prevent, decrease, and/or alter the ability of the liquid to evaporate. For example, the mask 505 may comprise an impermeable material which may not allow a liquid to pass through it. Therefore, the mask 505 may prevent liquid proximate a bottom 600 of the mask 505 from evaporating. Instead, the mask 505 may cause the liquid to recirculate in the top surface 315 as indicated by arrows 605. The recirculating liquid may increase the effective wick rate where the mask 505, which is dry, meets the top surface 315, which is wet. This region may be a dry-to-wet transition zone (DW zone) 610.

In some situations, where the mask 505 is absent, and an intrinsic liquid flow rate restriction exists within the top surface 315 such that evaporation rate potential exceeded wick rate, then scale build-up may form as superficial deposition. As scale build-up initiates and propagates, it may evolve to form an evaporation-biased DW zone, which may exacerbate scale build-up. Placing a mask 505 over such an area of the wicking material with an intrinsic wick rate deficiency may instead form a wick-biased DW zone 610. The mask 505, when applied in this way, may prevent scale build-up by increasing the effective wick rate such that it exceeds the evaporation rate potential.

Figure 7:
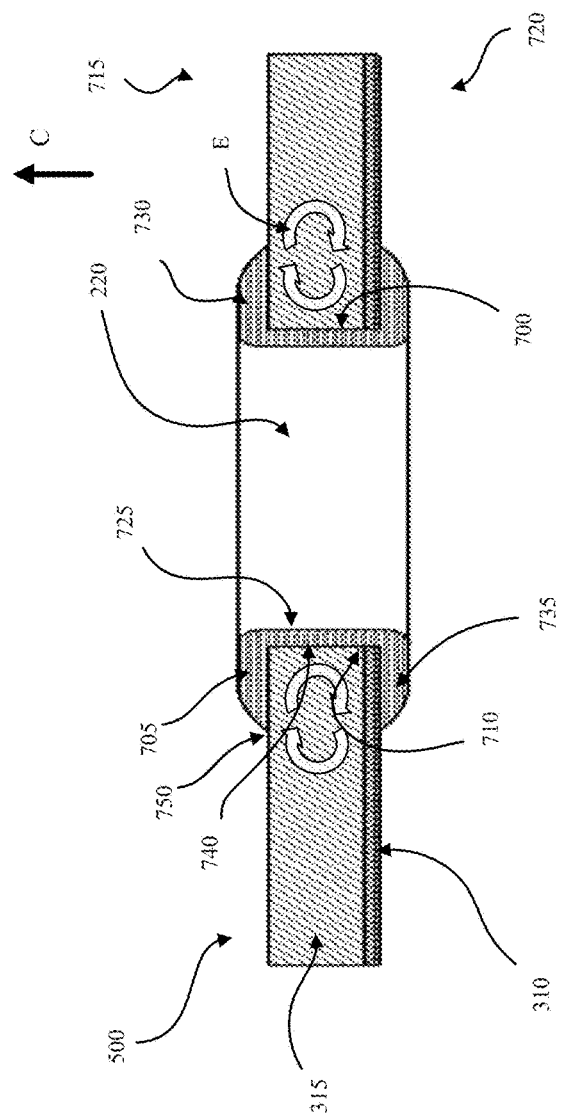
FIG. 7 is a cross-sectional view B-B of a perforation of the exemplary wet plate of FIG. 5, according to one exemplary embodiment.

FIG. 7 is a cross-sectional view B-B of a perforation 220 in the wet plate 500. While FIG. 7 is explained with reference to the perforations 220 in the wet plate 500, the concepts and description may readily apply to the perforations 230 in the dry plate 105B. The wet plate 500 may comprise a top surface 315, and a bottom surface 310 opposite the top surface 315. The top surface 315 may comprise a wicking material and the bottom surface 310 may comprise an impermeable layer. In alternative embodiments, the impermeable layer may be absent, meaning the bottom surface 310 may comprise a wicking material. In some embodiments, the wet plate 500 may comprise one or more grommets 705. The grommet 705 may be one example of a mask 505. In alternative embodiments, the wet plate 500 may include additional or fewer features than that which is shown in FIG. 6.

As mentioned, in a typical configuration, mineral doming may occur at the perforations 220, 230. For example, the perforation 220 may create discontinuity relative to a reduced wick rate as well as modifying the flow characteristics relative to the surface area of the wet plate 500. The combination of these perturbations may contribute to forming an evaporation-biased DW zone 710 located along the inner surface 700 of the perforation 220 at an interface between a wet side 715 and a dry side 720 of the wet plate 500. Eventually, enough scale build-up may occur around the perforation 220 in the DW zone 710 that the perforation 220 may be unusable or ineffective for its intended application.

To counteract the scale build-up in the DW zone 710, the grommet 705 may act as an impermeable mask around the perforation 220 and may prevent and/or reduce scale build-up. In some embodiments, the grommet 705 may be a ring 725 inserted into the perforation 220. The grommet 705 may be flared or collared at opposing ends to keep it in place. For example, the ring 725 may be inserted into the perforation 220. A tool (not shown) may deform the edges of the ring 725 to create two opposing collars 730, 735. The collars 730, 735 may retain the ring 725 within the perforation 220 and create the grommet 705. In some embodiments, the grommet 705 may be substantially tight fit to the wet plate 500. For example, an outer diameter 740 of the ring 725 may be approximately the same diameter as the inner surface 700 of the perforation 220. The grommet 705 may comprise a metal, plastic, rubber, or the like.

The grommet 705 may prevent scale build-up by causing liquid to recirculate rather than evaporate. For example, the grommet 705 may be an impermeable mask which may negate the effects of the DW zone 710 by relocating it to a second DW zone 750, which may be wick-biased, where the collar 730 meets the top surface 315. The grommet 705 may encapsulate the perforation 220 thereby reducing the wet surface area of the top surface 315 from exposure to air flow. This may protect against evaporation and simultaneously increase the effective wick rate, thus preventing scale build-up. Grommet 705 may allow the liquid to recirculate as indicated by arrows E and eventually evaporate from the top surface 315 in a direction indicated by arrow C, but the evaporation rate potential may be reduced relative to a configuration without the grommet 705. This may prevent scale build-up from forming in and around the perforation 220.

Figure 8:
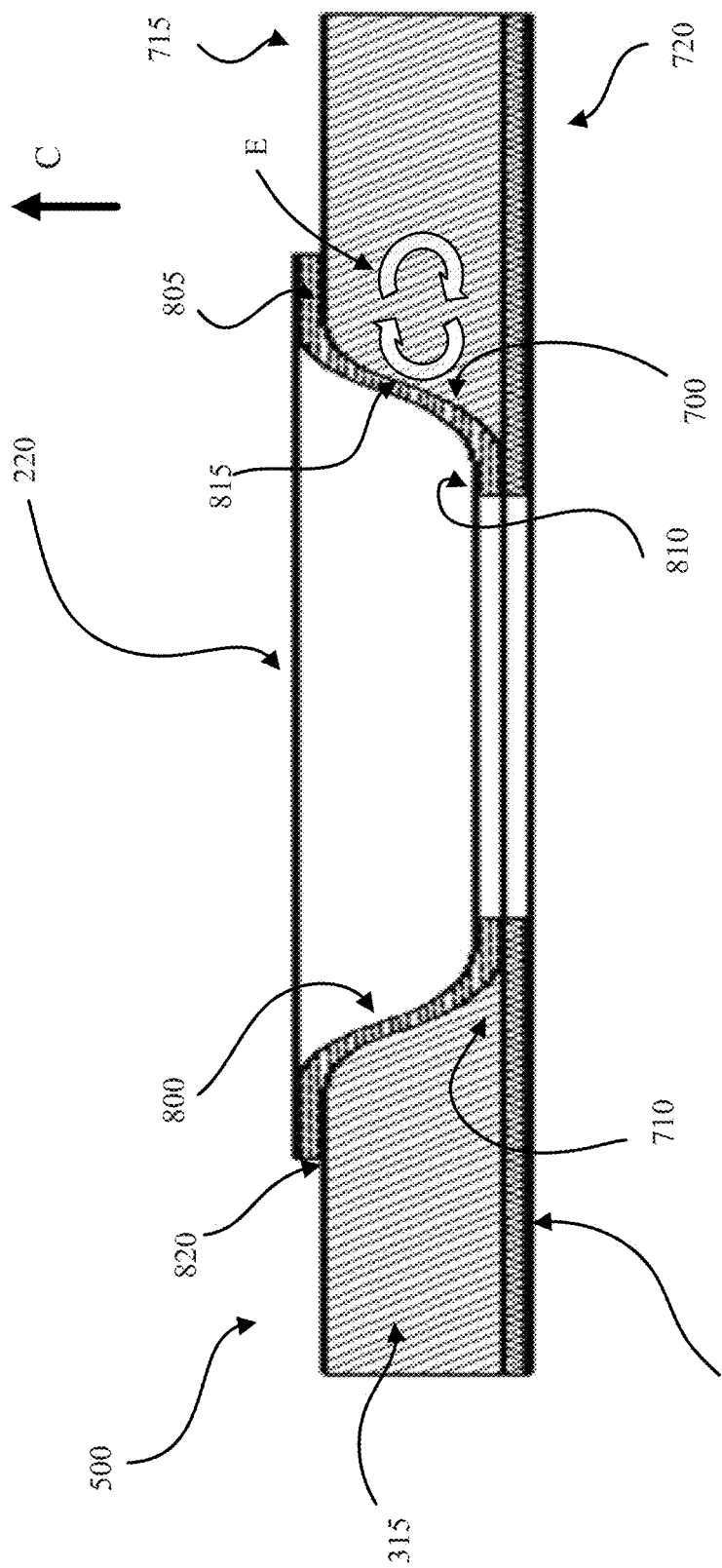
FIG. 8 is a cross-sectional view B-B of a perforation of the exemplary wet plate of FIG. 5, according to an additional exemplary embodiment.

FIG. 8 is an alternative embodiment of cross-sectional view B-B of the perforation 220 in FIG. 5. While FIG. 8 is explained with reference to the perforations 220 in the wet plate 500, the concepts and description may readily apply to the perforations 230 in the dry plate 105B. FIG. 8 displays the same wet plate 500 with the perforation 220 of FIG. 7; however, instead of the grommet 705, a washer 800 is introduced. The washer 800 may be one example of a mask 505. In some embodiments, the washer 800 may act as an impermeable barrier around the perforation 220 and may also counteract scale build-up at the perforation 220.

The washer 800 may be pressed onto the wicking material surface along the periphery of the perforation 220 and may be sealed to bottom surface 310 of the wet plate 500. For example, the washer 800 may have an upper lip 805, lower lip 810, and a side wall 815 connecting the lips 805, 810. The side wall 815 of the washer 800 may be pressed and/or adhered to the inner surface 700 of the perforation 220. The upper lip 805 may be pressed and/or otherwise adhered to the top surface 315 of the wet plate 500. The lower lip 810 may be adhered or otherwise sealed to the bottom surface 310 of the wet plate 500. The bottom surface 310 of the wet plate 500 and the lower lip 810 may form a tight, liquid-proof seal. The washer 800 may comprise an impermeable material. In some embodiments, the washer 800 may comprise an inflexible metal, plastic or rubber material. The washer 800 may be glued, heat bonded, or otherwise affixed to the wet plate 500. In other embodiments, the washer 800 may comprise a flexible material and may be molded, glued, heat bonded, or otherwise affixed to the wet plate 500. In still further embodiments, the washer 800 may be applied as a liquid substance which may harden to form the washer 800.

The washer 800 may create an impermeable mask around the DW zone 710 and prevent liquid from evaporating through the inner surface 700 of the perforation 220. Instead, as in examples using the grommet 705, a second DW zone 820 is created which may allow liquid to recirculate as shown by arrows E. The recirculating liquid may evaporate off of the wet plate 500 in a direction shown by arrow C, but the evaporation rate potential may be reduced relative to a configuration without the washer 800. By forming an impermeable seal around the perforation 220, the washer 800 may alter the ability of the liquid to evaporate and may reduce scale build-up.

Figure 9:
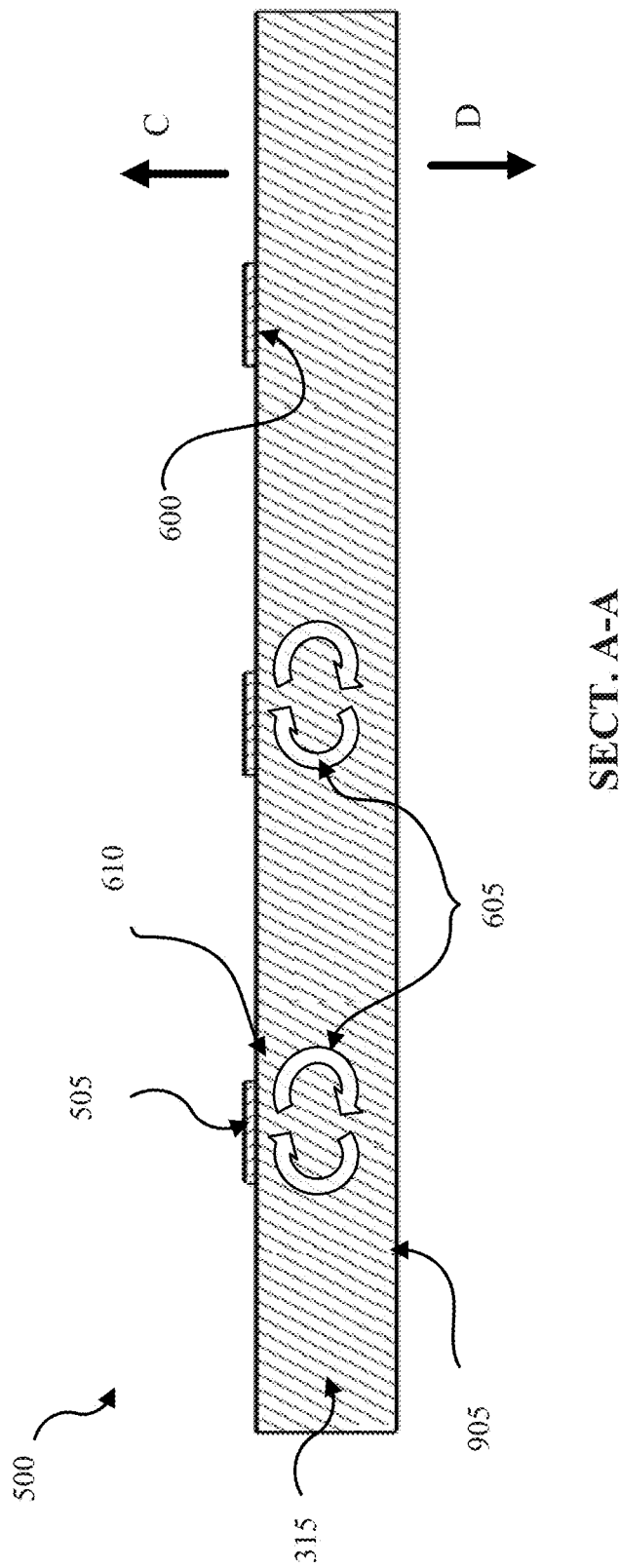
FIG. 9 is a cross-sectional view A-A of a portion of the exemplary wet plate of FIG. 5, according to a second exemplary embodiment.

FIG. 9 is an alternative exemplary embodiment of cross-section A-A of the wet plate 500 shown in FIG. 5. The wet plate 500 may comprise a top surface 315 which may comprise a wicking material. A bottom surface 905 of the wet plate 500, opposite the top surface 315, may additionally comprise a wicking material. The top surface 315 and bottom surface 905 may comprise the same wicking material, which may be porous, allowing a gaseous medium, such as air, to pass through the wicking material. This illustrated plate configuration may be similar to some direct evaporative coolers because the gaseous medium may be allowed to pass through the wicking material in either direction; for example from surface 315 toward 905, or from 905 toward 315. Therefore, the liquid flowing through the wicking material may evaporate in both directions, as indicated by arrows C and D. In some embodiments, the wet plate 500 may comprise one or more masks 505. In alternative embodiments, the wet plate 500 may include additional or fewer features than that which is shown in FIG. 9.

The masks 505 shown in FIG. 9 may be substantially similar to the masks shown in FIG. 5 and/or 6. For example, the masks 505 may be proximate the top surface 315 of the wet plate 500. The presence of the masks 505 may prevent, decrease, and/or alter the ability of a liquid to evaporate. For example, the mask 505 may prevent liquid proximate a bottom 600 of the mask 505 from evaporating. Instead, the mask 505 may cause the liquid to recirculate in the top surface 315 as indicated by arrows 605. The recirculating liquid may increase the effective wick rate by forming a wick-biased dry-to-wet transition zone (DW zone) 610.

In some embodiments, such as when the wicking material possesses an intrinsic wick rate deficiency, an evaporation-biased DW zone may be susceptible to scale build-up because of an increased propensity for evaporation rate potential to exceed wick rate. The presence of a mask 505 in an evaporation-biased DW zone such as this may create a new DW zone 610 which may shift the balance. For example, the presence of the mask 505 may create a wick-biased DW zone 610, which may prevent scale build-up by increasing the effective wick rate such that it exceeds the evaporation rate potential.

Figure 10:
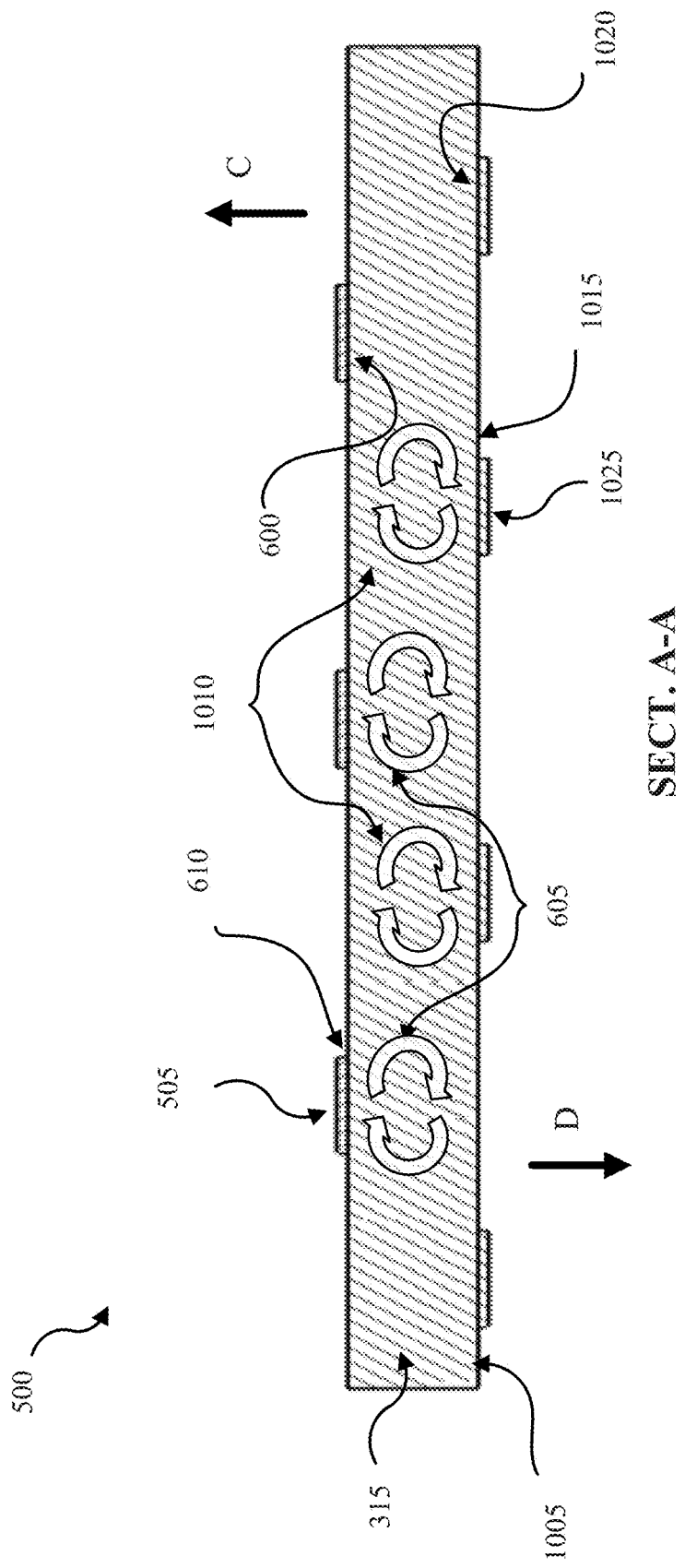
FIG. 10 is a cross-sectional view A-A of a portion of the exemplary wet plate of FIG. 5, according to a third exemplary embodiment.

FIG. 10 is another alternative exemplary embodiment of cross-section A-A of the wet plate 500 shown in FIG. 5. The wet plate 500 may comprise top surface 315 which may comprise a wicking material. A bottom surface 1005 of the wet plate 500 may additionally comprise the wicking material. Similar to FIG. 9, the top surface 315 and bottom surface 1005 may comprise the same wicking material, which may be porous, allowing a gaseous medium, such as air, to pass through the wicking material. The gaseous medium may be allowed to pass through the wicking material in either direction; for example from surface 315 toward 1005, or from 1005 toward 315. Therefore, the liquid flowing through the wicking material may evaporate in both directions, as indicated by arrows C and D. The wet plate 500 may comprise one or more masks 505 proximate the wet plate 500 and one or more masks 1025 proximate the bottom surface 1005. In alternative embodiments, the wet plate 500 may include additional or fewer features than that which is shown in FIG. 10.

As shown in FIG. 10, the masks 1025 proximate the bottom surface 1005 of the wet plate 500 may be staggered with masks 505 proximate the top surface 315 of the wet plate 500. The presence of the mask 1025 proximate the bottom surface 1005 of the wet plate 500 may prevent, decrease, and/or alter the ability of a liquid to evaporate in a direction D. For example, the mask 1025 may prevent liquid proximate a bottom 1020 of the mask 1025 from evaporating. Instead, the mask 1025 may cause the liquid to recirculate in the wet plate 500 as indicated by arrows 1010.

The introduction of one or more masks 1025 to the bottom surface 1005 of the wet plate 500 may provide one or more additional wick-biased DW zones 1015. As in FIG. 9, the DW zones 1015 may prevent scale build-up by further increasing the effective wick rate such that it exceeds the evaporation rate potential.

Figure 11:
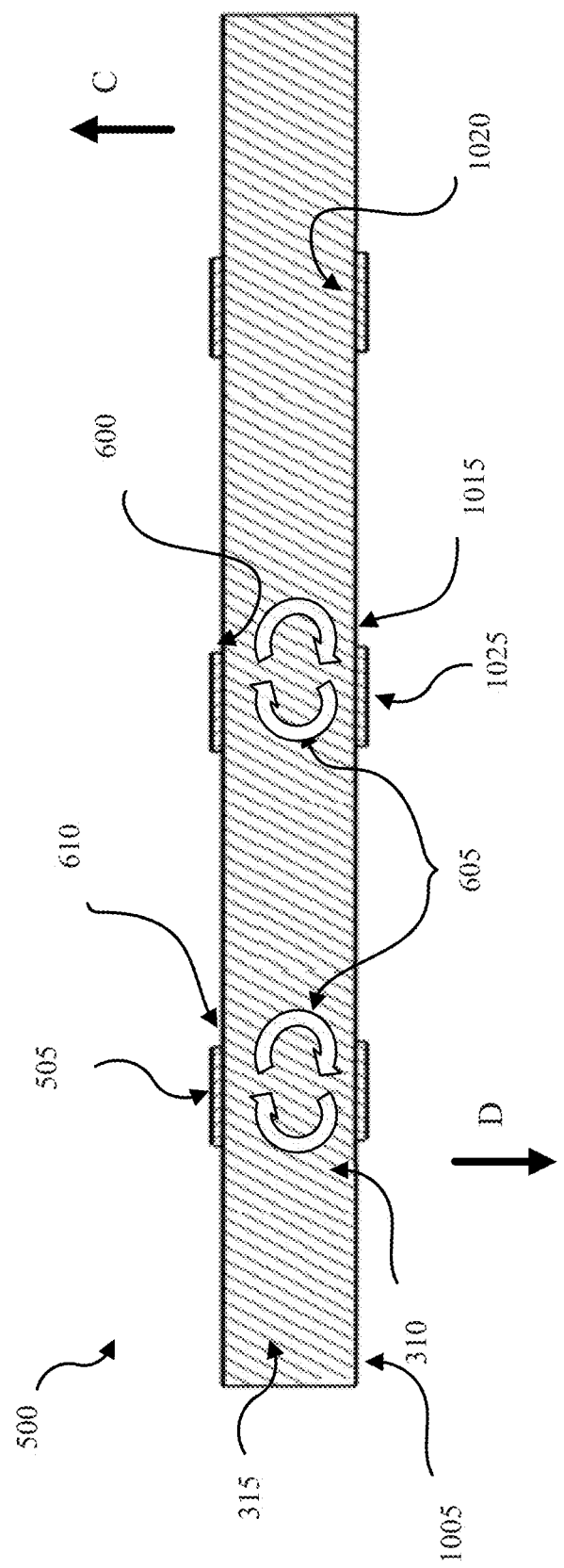
FIG. 11 is a cross-sectional view A-A of a portion of the exemplary wet plate of FIG. 5, according to a fourth exemplary embodiment.

FIG. 11 is another alternative exemplary embodiment of cross-section A-A of the wet plate shown in FIG. 5. The wet plate shown in FIG. 11 is substantially similar to the wet plate 500 shown in FIG. 10. However, as shown in the figure, the masks 1025 proximate the bottom surface 1005 of the wet plate 500 substantially align with the masks 505 proximate the top surface 315 of the wet plate 500. The masks 1025 may increase a wick rate by increasing the amount of liquid recirculating between the masks 505,1025. For example, the masks 1025 may comprise an impermeable material preventing liquid from evaporating through them. Instead, liquid may recirculate as shown by arrows 605. Therefore, the presence of the masks 1025 may cause additional liquid to recirculate. In some embodiments, this may cause an increased wick rate which may create a wick-biased DW zone 1015.

While the technology of the present application is described with respect to evaporative air conditioners, the technology disclosed herein may be applicable to other air conditioners, and even more generally to any application where a liquid evaporates from a wetted surface. Moreover, the technology disclosed herein will be described with reference to certain exemplary embodiments. The word "exemplary" is used herein to mean "serving as an example, instance, or illustration." Any embodiment described herein as "exemplary" is not necessarily to be construed as preferred or advantageous over other embodiments absent a specific indication that such an embodiment is preferred or advantageous over other embodiments. Moreover, in certain instances only a single "exemplary" embodiment is provided. A single example is not necessarily to be construed as the only embodiment. The detailed description includes specific details for the purpose of providing a thorough understanding of the technology of the present patent application. However, on reading the disclosure, it will be apparent to those skilled in the art that the technology of the present patent application may be practiced with or without these specific details. In some descriptions herein, generally understood structures and devices may be shown in block diagrams to aid in understanding the technology of the present patent application without obscuring the technology herein. In certain instances and examples herein, the term "coupled" or "in communication with" means connected using either a direct link or indirect data link as is generally understood in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A plate for an evaporative cooler, comprising:
   a top surface comprising a liquid for the evaporative cooler;
   one or more masks lining at least a portion of the top surface, the one or more masks impermeable to the liquid thereby preventing the liquid from evaporating through the one or more masks, the one or more masks sized and shaped such that a wick rate of the liquid on the top surface of the plate exceeds an evaporation rate of the liquid on the plate;
   a bottom surface opposite the top surface, the bottom surface comprising an impermeable barrier for the liquid; and
   one or more perforations passing at least partially through the plate, wherein at least one mask of the one or more masks at least partially lines at least one perforation of the one or more perforations, at least one mask relocating a dry-to-wet transition zone for the liquid from an edge of the at least one perforation to a junction between the top surface of the plate and a bottom surface of the at least one mask.

2. The plate of claim 1, wherein the one or more masks comprise a strip of impermeable material coupled to a flat area of the top surface.

3. The plate of claim 2, further comprising:
   at least two masks forming strips lining the top surface, wherein the at least two masks align with each other.

4. The plate of claim 2, wherein the one or more masks align with a liquid wick path of the top surface.

5. The plate of claim 1, further comprising one or more channel guides coupled to the top surface.

6. The plate of claim 1, wherein the top surface comprises a wicking material.

7. The plate of claim 6, wherein the wicking material draws the liquid across the top surface of the plate.

8. The plate of claim 1, wherein the at least one mask comprises one or more of a washer and a grommet.

9. The plate of claim 1, wherein the at least one mask comprises one or more of a flare, a collar, and a lip.

10. An indirect evaporative air cooler, comprising:
an assembly of at least two plates, wherein the at least two plates are separated by one or more channel guides, the at least two plates comprising:
a top surface comprising a wicking material with an exposed surface for receiving a liquid thereon, and a bottom surface opposite the top surface, the bottom surface comprising a sealed, impermeable barrier for the liquid;
one or more masks lining at least a portion of the exposed surface, the one or more masks impermeable to the liquid thereby preventing the liquid from evaporating through the one or more masks, the one or more masks sized and shaped such that a wick rate of the liquid on the exposed surface exceeds an evaporation rate of the liquid; and
one or more perforations in at least one of the at least two plates, wherein at least one mask of the one or more masks at least partially lines at least one perforation of the one or more perforations, the at least one mask relocating a dry-to-wet transition zone for the liquid from an edge of the at least one perforation to a junction between the top surface of the at least one plate and a bottom surface of the at least one mask.

11. The indirect evaporative air cooler of claim 10, further comprising:
one or more troughs proximate the at least two plates, and
a liquid delivery apparatus proximate the one or more troughs.

12. The indirect evaporative air cooler of claim 10, wherein the one or more masks comprise a strip of impermeable material coupled to a flat area of the exposed surface.

13. The indirect evaporative air cooler of claim 10, wherein the at least one mask comprises one or more of a washer and a grommet.

14. The indirect evaporative air cooler of claim 10, wherein the at least one mask comprises one or more of a flare, a collar, and a lip.

15. A plate for an evaporative cooler, comprising:
a wicking material with at least one exposed surface for receiving a liquid;
one or more masks lining a portion of the at least one exposed surface, wherein the one or more masks comprise an impermeable material to the liquid thereby preventing the liquid from evaporating through the one or more masks, wherein the one or more masks comprise a strip of the impermeable material coupled to a flat area of the at least one exposed surface, wherein the one or more masks comprise a surface area sufficient such that a wick rate of the liquid through the wicking material exceeds an evaporation rate of the liquid, and wherein the one or more masks relocate a dry-to-wet transition zone for the liquid from a junction between the at least one exposed surface and a bottom surface of the one or more masks; and
one or more perforations passing through the plate, wherein at least one mask of the one or more masks at least partially lines at least one perforation of the one or more perforations.

16. The plate of claim 15, wherein the at least one mask comprises one or more of a washer and a grommet.

17. The plate of claim 15, wherein the at least one mask comprises one or more of a flare, a collar, and a lip.

* * * * *